United States Patent [19]

Buxel et al.

[11] Patent Number: 4,591,335

[45] Date of Patent: May 27, 1986

[54] PROCESS FOR REHEATING AND CONVEYING A GRANULAR HEAT CARRIER

[75] Inventors: Ludwig M. Buxel, Waltrop; Ludwig Mühlhaus, Nothweg; Ulrich Neumann, Dortmund, all of Fed. Rep. of Germany

[73] Assignee: Uhde GmbH, Dortmund, Fed. Rep. of Germany

[21] Appl. No.: 530,208

[22] Filed: Sep. 8, 1983

[30] Foreign Application Priority Data

Sep. 10, 1982 [DE] Fed. Rep. of Germany ....... 3233533

[51] Int. Cl.⁴ .......................... F27B 15/00; F26B 3/08
[52] U.S. Cl. .......................................... 432/15; 34/10; 432/197
[58] Field of Search ............... 34/10; 432/14, 15, 197, 432/215

[56] References Cited

U.S. PATENT DOCUMENTS 4,153,411  5/1979  Isheim ................................. 432/197
4,389,381  6/1983  Dinovo ................................. 432/15

Primary Examiner—John J. Camby
Attorney, Agent, or Firm—Toren, McGeady, Stanger, Goldberg & Kiel

[57] ABSTRACT

In reheating and conveying a granular heat carrier, such as sand, which is transportable by a gas and is used for desorption by heating a charged lumpy adsorber, such as activated carbon pellets, the sand is passed upwardly in a cylindrically shaped pipe element in the form of a fluidized bed. The sand is heated during its upward passage through the fluidized bed. Air introduced into the lower part of the pipe element is used as the fluidizing medium and also as combustion air. Further, fuel is supplied into the lower part of the pipe element. From the upper end of the pipe element, the heated sand flows downwardly by gravity to a sand separator, where it is separated from flue gas, into a desorber where it is contacted by the absorbent and then into a device for separating the sand and the adsorbent so that the sand can be returned into the lower end of the pipe element.

1 Claim, 1 Drawing Figure

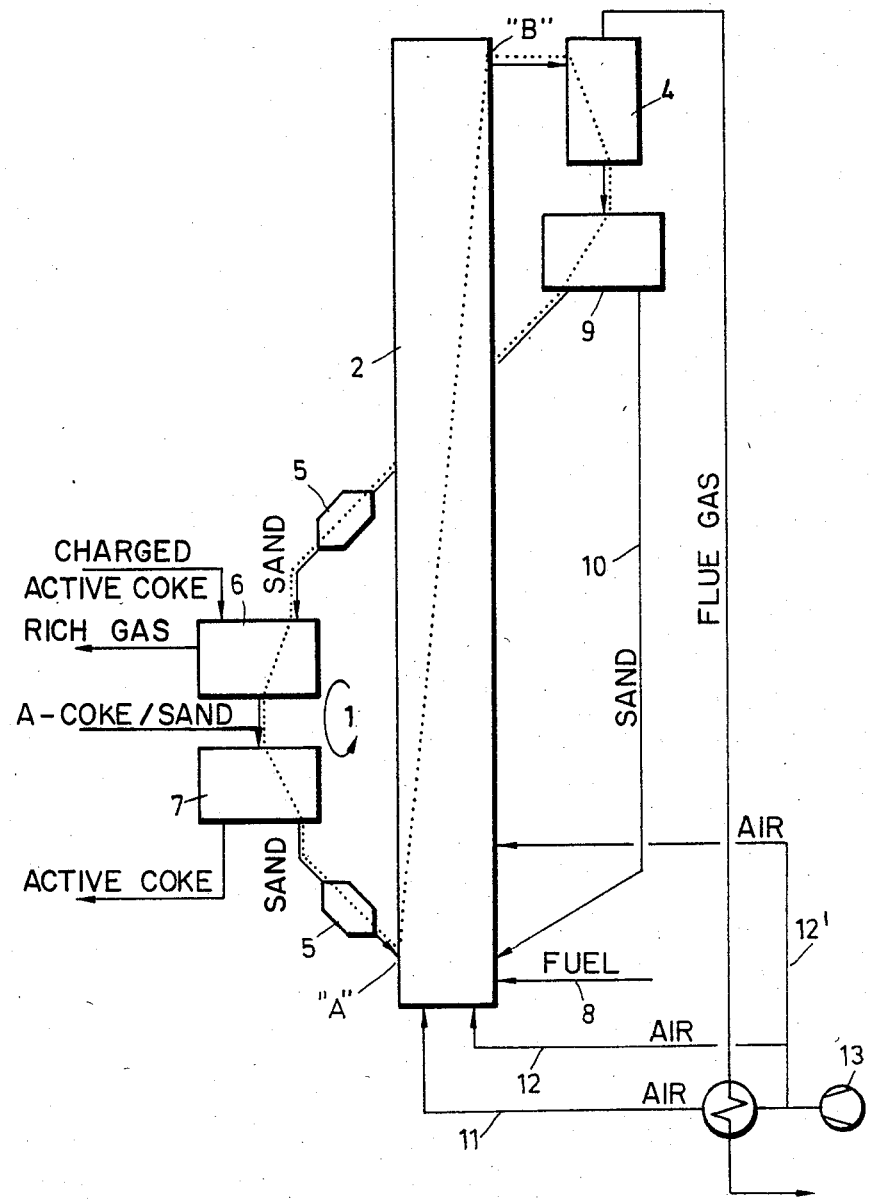

PROCESS FOR REHEATING AND CONVEYING A GRANULAR HEAT CARRIER

SUMMARY OF THE INVENTION

The present invention is directed to a process of and equipment for reheating and conveying a granular heat carrier, such as sand, transportable by a gas and used for desorption by heating a charged lumpy adsorbent, such as activated carbon pellets.

In (Chem. Ind. XXVII/August 1975, pages 457 to 461), Knoblauch describes among other things the experience gained in flue gas desulphurization. In the flue gas desulphurization process described with desorption by charged activated coke, where the activated coke is brought into contact with sand of about 750° C. in a desorber of special design, the sand leaving the desorber is fed to a combustion chamber after it is separated from the coke and, together with the hot flue gases produced, is returned in the reheated state to the top for reuse. This so-called "gas-lift" has numerous advantages, however, it also has serious disadvantages such as very high gas velocities which cause considerable wear and tear and a very high energy consumption. Moreover, part of the flue gases must be recycled for cooling the gas lift masonry. The high-temperature-resistant masonry, in turn, involves a considerable investment.

The primary object of the present invention is to provide a process and equipment which avoids the afore-mentioned disadvantages and affords, in particular, low conveying speeds, low temperatures and a considerable fuel economy.

In accordance with the present invention, the problems experienced in the past are solved by a process in which the heat carrier is conveyed vertically upward through a fluidized bed and is heated during the upward flow. In accordance with a special embodiment, a highly expanded circulating fluidized bed is used.

The term "circulating fluidized bed" implies a highly expanded fluidized bed with circulating bed material. The term is more exactly defined in the essay by L. Reh, "Fluidized Bed Processing" in "Chemical Engineering Progress" (Vol. 67, No. 2), February 1971, in which the designation "Fast Fluidization" was chosen. In this essay, the so-called "circulating fluidized bed" is used for calcining aluminum hydroxide according to the Lurgi process. In the German Offenlegungsschrift No. 25 10 116 such a circulating fluidized bed is known to be used for the reduction of iron(III)oxide-containing material.

These known applications of fluidized beds do not serve the purpose of heating and conveying a granular heat carrier as is the case in the present inventon.

In accordance with one embodiment of the present invention, the heat carrier leaving the fluidized bed flows by gravity to a desorber and a device for separating the heat carrier from the adsorbent before the heat carrier is returned to the inlet of the conveying system.

In another embodiment, the heat carrier exiting from the circulating fluidized bed flows by gravity to a heat carrier separator, a heat carrier distributor, if any, and a heat carrier receiver before reaching the desorber.

Gravity flow allows an especially simple and economical process performance. The combination of the conveying section and of the heating section permits the use of lower-grade materials than are required fdr conventional conveying processes as described above, because the flame heat is rapidly transferred to the bed material and thus the enclosed wall is not exposed to very high temperatures.

Due to this fact a near stoichiometric and thus energy saving combustion is realized in cases where small air quantities are sufficient for the conveying process, but where large fuel quantities are required at the same time for heating the heat carrier. A substoichiometric combustion is, of course, also possible.

In a further embodiment of the present invention, in the case of adsorption by activated coke, the fines which result from abrasion are utilized for heating the heat carrier. This embodiment yields an especially favorable energy balance for the process.

An essential feature of the invention is that the heat carrier is fed to the conveying system at a temperature greater than 400° C., preferably at about 650° C., while the heat carrier leaves the fluidized bed in a temperature range of 700° to 850° C. The optimum temperatures may be selected for the specific process.

It may be expedient to return part of the heat carrier directly from the heat carrier distributor to the inlet into the conveying system as in another embodiment of the present invention. This "short circuiting" of the heat carrier cycle may be advisable when an excessive amount of heat carrier is recycled and/or at the commencement of the process when it is impossible or inexpedient to charge the desorber directly with the heat carrier in the cold state.

It is advantageous to provide the fuel input in the lower third of the conveying system in accordance with the present invention.

For obtaining a complete discharge of the heat carrier from the circulating fluidized bed, that is, to maintain a constant heat carrier recycle flow, in accordance with the present invention fine sand of substantially uniform grain-size should be used as the heat carrier.

In accordance with the present invention, the equipment for carrying out the process comprises a conveying system including a substantially cylindrically shaped pipe element charged with sand to be heated, air used as fluidizing air and as combustion air is introduced into the lower part of the pipe element along with fuel, the heated sand and flue gas is removed from the upper end of the pipe element and introduced into a sand separator. Subsequently, the sand flows through a desorber where it is combined with the adsorbent and then through a device for separating the sand from the adsorbent. Flow from the pipe element through the sand separator, the desorber and the separating device takes place by gravity before the sand is returned to the inlet into the conveying system.

In a further embodiment of the invention, the fluid bed height is determined against the sand, air, fuel quantity and temperature as well as the cross section and height of the distance between the inlet and outlet in the pipe element so that the minimum required distance between the inlet and outlet is assured and the sand is completely discharged from the fluidizing bed at the end of the conveying system.

In still another embodiment of the invention, the sand distributor is equipped with a recycle line for returning part of the sand directly to the inlet of the conveying system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a schematic view of the equipment embodying the present invention used for flue gas desulphurization by means of activated coke.

DETAILED DESCRIPTION OF THE INVENTION

In the sand cycle 1 represented by a dotted line in the drawing, sand is introduced at the lower part "A" of conveying system 2. The conveying system 2 is a vertically extending cylindrically shaped pipe element. Carrier air is introduced from an air blower 13 into the lower end of the conveying system 2 so that the air converts the sand into a highly expanded fluidized bed. The fluidizing effect of the air is sufficient to discharge the sand from the upper end "B" of the conveying system. From upper end "B" the sand flows by gravity through a sand separator, that is, a cyclone 4, a sand receiver 5 acting as a pressure compensator, and then into a desorber 6.

In the desorber 6 the sand contacts a charged activated coke supplied into the desorber and the combination of the sand and coke flows into a separator 7 for separating the two separate constituents. Sand is removed from the separator 7 and passes into another sand receiver 5 and then returns to the inlet at the lower end "A" of the conveying system for the commencement of another sand cycle. The activated coke separated out in the separator 7 is removed at a separate location from the sand.

In addition to air, fuel, such as oil, is fed through the line 8 into the lower third of the conveying system 2. An optimum combustion of the fuel along with the activated coke fines remaining in the sand as a result of abrasion, is achieved in the circulating fluidized bed without any thermal overload on the walls of the conveying system formed by the cylindrically shaped pipe element. In this procedure, the temperatures are in the range of about 700° C. to 850° C. as compared to 1500° C. in a gas lift. Preheated carrier air passing through a heat exchanger, heated by the flue gases removed from the separator 4, flow through the line 11 into the lower end of the cylindrically shaped pipe element. In addition to the preheated carrier air, additional cold air inlet lines 12, 12' are connected to the lower part of the pipe element.

In the drawing, a sand distributor 9 is connected to the lower end of the sand separator 4 so that a certain amount of sand can be returned directly via recycle line 10 to the inlet into the conveying system, without passing in heat transfer relation with the adsorbent.

The above embodiments of the invention may, of course, be altered in many respects without parting from the fundamental concept of the invention. Accordingly, the invention is not limited to use in the desorption stage of the flue gas desulphurization process, it can be used wherever a granular heat carrier transportable by gas is involved. The invention is likewise not limited to heating of the gas carrier but may also be used in cooling, such as where the fluidizing air is kept cold.

While specific embodiments of the invention have been shown and described in detail to illustrate the application of the inventive principles, it will be understood that the invention may be embodied otherwise without departing from such principles.

We claim:

1. Proces for reheating and conveying a granular heat carrier transportable by gas for desorption by heating a charged lumpy adsorbent, such as activated carbon pellets, comprising introducing a fine sand of essentially uniform grain size as the heat carrier at a temperature greater than 400° C. into the lower part of a vertically extending laterally enclosed space so that a bed formed only of the fine sand is located within that enclosed space, introducing the gas into the lower end of the space, fluidizing the sand by means of the gas and forming the bed of sand into a highly expanded circulating fluidized bed moving upwardly through the enclosed space with the fluidizing effect of the gas being sufficient to discharge the sand from the upper end of the space, introducing fuel into the lower third of the enclosed space and providing combustion of the fuel in the fluidized bed for heating the heat carrier during its upward passage through the fluidized bed so that the sand is in the range of 700°–850° C. when it is discharged from the upper end of the space.

* * * * *